United States Patent
Ellgardt et al.

(10) Patent No.: US 11,996,879 B2
(45) Date of Patent: May 28, 2024

(54) REMOVAL OF PASSIVE INTERMODULATION IN ANTENNA SYSTEMS

(71) Applicant: Telefonaktiebolaget LM Ericsson (publ), Stockholm (SE)

(72) Inventors: Jin Ellgardt, Sundbyberg (SE); Spendim Dalipi, Sollentuna (SE); Mats Gan Klingberg, Enebyberg (SE); Haiying Cao, Beijing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 56 days.

(21) Appl. No.: 17/911,705

(22) PCT Filed: Mar. 18, 2020

(86) PCT No.: PCT/CN2020/079862
§ 371 (c)(1),
(2) Date: Sep. 15, 2022

(87) PCT Pub. No.: WO2021/184232
PCT Pub. Date: Sep. 23, 2021

(65) Prior Publication Data
US 2023/0179252 A1    Jun. 8, 2023

(51) Int. Cl.
*H04B 1/525* (2015.01)
*H04B 7/06* (2006.01)

(52) U.S. Cl.
CPC ........... *H04B 1/525* (2013.01); *H04B 7/0617* (2013.01)

(58) Field of Classification Search
None
See application file for complete search history.

(56) References Cited

U.S. PATENT DOCUMENTS

| | | | | |
|---|---|---|---|---|
| 8,855,175 B2* | 10/2014 | Wyville | ........... | H04B 1/109 |
| | | | | 375/220 |
| 8,890,619 B2* | 11/2014 | Wyville | ........... | H04B 1/525 |
| | | | | 330/296 |

(Continued)

FOREIGN PATENT DOCUMENTS

| | | | | |
|---|---|---|---|---|
| BR | 112019008610 A2 * | 9/2019 | ......... | H04B 1/0475 |
| CN | 102291222 A | 12/2011 | | |

(Continued)

OTHER PUBLICATIONS

L. Mingtai, W. Zunfeng and L. Tao, "Test technique for passive inter-modulation distortion," 2013 IEEE 11th International Conference on Electronic Measurement & Instruments, Harbin, China, 2013, pp. 370-373, doi: 10.1109/ICEMI.2013.6743081. (Year: 2013).*

(Continued)

*Primary Examiner* — Berhanu Tadese
(74) *Attorney, Agent, or Firm* — Rothwell, Figg, Ernst & Manbeck, P.C.

(57) ABSTRACT

There is provided mechanisms for PIM removal in an antenna system. A method is performed by a controller of the antenna codebook based beamforming, which transmission radio chains of the antenna system that cause a signal received by receiver radio chains of the antenna system to be impacted by PIM. These transmission radio chains are identified based on which codeword in the codebook is used for the beamforming. The method comprises determining a correction signal by subjecting the signals only as transmitted by the identified transmission radio chains to a model of the PIM. The method comprises removing PIM from the signal received by the receiver radio chains by subtracting the correction signal from the signal received by the receiver radio chains.

17 Claims, 6 Drawing Sheets

(56) References Cited

U.S. PATENT DOCUMENTS

| | | | |
|---|---|---|---|
| 8,983,454 B2 | 3/2015 | Bevan et al. | |
| 9,026,064 B2* | 5/2015 | Wang | H04B 1/109 330/49 |
| 9,253,786 B2* | 2/2016 | Kazmi | H04W 72/541 |
| 9,438,285 B2* | 9/2016 | Wyville | H04J 11/0023 |
| 9,461,697 B2* | 10/2016 | Yu | H04B 15/00 |
| 9,660,673 B2* | 5/2017 | Miao | H04L 25/03343 |
| 9,673,861 B2* | 6/2017 | Heinikoski | H04L 5/1461 |
| 9,729,178 B2* | 8/2017 | Wyville | H04J 11/0023 |
| 9,768,812 B1* | 9/2017 | Tsui | H04B 17/0085 |
| 9,882,591 B2* | 1/2018 | Bevan | H04B 1/123 |
| 10,039,022 B2* | 7/2018 | Tsui | H04B 17/0085 |
| 10,141,961 B1* | 11/2018 | Huang | H04B 1/0475 |
| 10,187,098 B1* | 1/2019 | Tsui | H04B 1/0466 |
| 10,389,476 B2* | 8/2019 | Stephenne | H04L 1/0009 |
| 10,440,660 B2* | 10/2019 | Laporte | H04W 52/16 |
| 10,601,455 B2* | 3/2020 | Bevan | H04J 11/0063 |
| 10,601,456 B2* | 3/2020 | Tsui | H04B 17/11 |
| 11,303,337 B2* | 4/2022 | Stephenne | H04B 7/0617 |
| 11,589,361 B2* | 2/2023 | Stephenne | H04B 7/086 |
| 2012/0295558 A1* | 11/2012 | Wang | H04B 1/123 455/79 |
| 2014/0036736 A1* | 2/2014 | Wyville | H04B 1/525 370/278 |
| 2014/0036969 A1* | 2/2014 | Wyville | H04B 1/38 375/219 |
| 2014/0292609 A1* | 10/2014 | Schadler | H01Q 1/00 343/850 |
| 2015/0244414 A1* | 8/2015 | Yu | H04B 1/109 455/73 |
| 2016/0322995 A1* | 11/2016 | Bevan | H04B 1/10 |
| 2017/0141807 A1* | 5/2017 | Chen | H04B 1/123 |
| 2017/0141938 A1* | 5/2017 | Chen | H04B 1/12 |
| 2018/0248576 A1* | 8/2018 | Coe | H04B 1/1027 |
| 2018/0316086 A1* | 11/2018 | Lehman | H04W 76/40 |
| 2018/0331671 A1* | 11/2018 | Jian | H03H 7/463 |
| 2018/0351588 A1* | 12/2018 | Ohta | H04B 1/0064 |
| 2019/0007078 A1* | 1/2019 | Tsui | H04B 1/0466 |
| 2019/0081831 A1* | 3/2019 | Shakedd | H03D 3/002 |
| 2019/0104457 A1* | 4/2019 | Lindoff | H04W 72/535 |
| 2019/0158131 A1* | 5/2019 | Tsui | H04B 1/0475 |
| 2019/0253098 A1* | 8/2019 | Lv | H04B 1/1018 |
| 2019/0363750 A1* | 11/2019 | Lai | H04B 1/109 |
| 2020/0021323 A1* | 1/2020 | Cyzs | H04B 1/123 |
| 2020/0382188 A1* | 12/2020 | Stephenne | H04B 7/0617 |
| 2021/0185692 A1* | 6/2021 | Stephenne | H04W 72/1263 |
| 2022/0069898 A1* | 3/2022 | Abdelmonem | H04B 7/0413 |
| 2023/0081201 A1* | 3/2023 | Fleischer | H04B 7/088 375/267 |
| 2023/0179252 A1* | 6/2023 | Ellgardt | H04B 1/525 375/267 |

FOREIGN PATENT DOCUMENTS

| | | | | |
|---|---|---|---|---|
| CN | 103002493 A | | 3/2013 | |
| CN | 103986482 A | | 8/2014 | |
| CN | 104883197 A | * | 9/2015 | H04B 1/109 |
| CN | 106537794 A | * | 3/2017 | H04B 1/0475 |
| CN | 103380650 B | * | 9/2017 | H04W 72/082 |
| CN | 103973351 B | * | 12/2017 | |
| CN | 107453782 A | | 12/2017 | |
| CN | 108141237 A | * | 6/2018 | H04B 1/109 |
| CN | 108352978 A | | 7/2018 | |
| CN | 108352978 A | * | 7/2018 | H04B 1/12 |
| CN | 104716972 B | * | 8/2018 | H04B 1/525 |
| CN | 109495127 A | * | 3/2019 | H04B 1/525 |
| CN | 109845118 A | * | 6/2019 | H04B 1/0475 |
| CN | 208955159 U | * | 6/2019 | H04B 17/306 |
| CN | 209001952 U | * | 6/2019 | H04B 1/525 |
| CN | 103002493 | * | 7/2019 | H04B 17/309 |
| CN | 106537794 B | * | 7/2019 | H04B 1/0475 |
| CN | 209088944 U | * | 7/2019 | H04B 7/0617 |
| CN | 110447146 A | * | 11/2019 | H01L 23/4855 |
| CN | 110574227 A | * | 12/2019 | H01Q 1/02 |
| CN | 110663191 A | * | 1/2020 | H04B 1/0475 |
| CN | 112205056 A | * | 1/2021 | H04B 7/0617 |
| CN | 108352978 B | * | 6/2021 | H04B 1/12 |
| CN | 110603737 B | * | 4/2022 | H04B 17/309 |
| CN | 114665926 A | * | 6/2022 | H04B 17/309 |
| CN | 115244858 A | * | 10/2022 | H04B 1/525 |
| EP | 2710740 A1 | * | 3/2014 | H04B 1/109 |
| EP | 3 176 951 A1 | | 6/2017 | |
| EP | 3176951 A1 | * | 6/2017 | H04B 1/10 |
| EP | 3170265 B1 | * | 3/2018 | H04B 1/0475 |
| EP | 3357165 A1 | * | 8/2018 | H04B 1/109 |
| EP | 3357165 A4 | * | 11/2018 | H04B 1/109 |
| EP | 3472939 A1 | * | 4/2019 | H04B 1/109 |
| EP | 3531565 A1 | * | 8/2019 | H04B 1/0475 |
| EP | 3531565 A4 | * | 8/2019 | H04B 1/0475 |
| EP | 3176951 B1 | * | 9/2021 | H04B 1/10 |
| GB | 2551695 B | * | 11/2019 | H04B 1/1027 |
| JP | 2015019166 | * | 1/2015 | H04B 1/0479 |
| KR | 102365600 | * | 11/2017 | H04W 64/00 |
| KR | 102102059 | * | 11/2018 | H04W 72/082 |
| WO | WO-9859523 A2 | * | 12/1998 | H04J 13/16 |
| WO | WO-2012161632 A1 | * | 11/2012 | H04B 1/109 |
| WO | WO-2012161632 A9 | * | 12/2012 | H04B 1/109 |
| WO | WO-2017006155 A1 | * | 1/2017 | H04B 1/1027 |
| WO | WO-2017072552 A1 | * | 5/2017 | H04B 1/1027 |
| WO | WO-2017080345 A1 | * | 5/2017 | H04B 1/109 |
| WO | WO-2017080349 A1 | * | 5/2017 | H04B 1/12 |
| WO | WO-2017093784 A1 | * | 6/2017 | H04L 1/0002 |
| WO | WO-2017157461 A1 | * | 9/2017 | H04B 15/02 |
| WO | 2017/212265 A1 | | 12/2017 | |
| WO | WO-2017212265 A1 | * | 12/2017 | H04B 1/1027 |
| WO | WO-2017220104 A1 | * | 12/2017 | H04B 1/109 |
| WO | WO-2018026316 A1 | * | 2/2018 | |
| WO | WO-2018055435 A1 | * | 3/2018 | H04B 1/0475 |
| WO | WO-2018058619 A1 | * | 4/2018 | H04B 1/04 |
| WO | WO-2018076373 A1 | * | 5/2018 | H04B 1/0475 |
| WO | WO-2018119153 A2 | * | 6/2018 | H01L 23/4855 |
| WO | WO-2018213558 A1 | * | 11/2018 | H04B 1/0475 |
| WO | WO-2019140669 A1 | * | 7/2019 | H04B 7/0456 |
| WO | WO-2019153959 A1 | * | 8/2019 | H04B 1/109 |
| WO | 2019/220179 A1 | | 11/2019 | |
| WO | 2019/220180 A1 | | 11/2019 | |
| WO | WO-2019220179 A1 | * | 11/2019 | H04B 7/0617 |
| WO | WO-2019220180 A1 | * | 11/2019 | H04B 7/0434 |
| WO | WO-2019239196 A1 | * | 12/2019 | H04L 1/0003 |
| WO | WO-2019245533 A1 | * | 12/2019 | |
| WO | WO-2020113928 A1 | * | 6/2020 | |
| WO | 2020/204772 A1 | | 10/2020 | |
| WO | WO-2021184232 A1 | * | 9/2021 | H04B 1/525 |
| WO | WO-2021184232 A9 | * | 11/2021 | H04B 1/525 |
| WO | WO-2022046531 A1 | * | 3/2022 | H01Q 1/002 |
| WO | WO-2023037146 A1 | * | 3/2023 | |

OTHER PUBLICATIONS

J. Henrie, A. Christianson and W. J. Chappell, "Engineered Passive Nonlinearities for Broadband Passive Intermodulation Distortion Mitigation," in IEEE Microwave and Wireless Components Letters, vol. 19, No. 10, pp. 614-616, Oct. 2009, doi: 10.1109/LMWC.2009.2029733. (Year: 2009).*

B. Jang, H. Kim, Y. Seo, S. Im and S. Hong, "Mitigation of the Third-Order Passive Intermodulation Distortion Interference on Uplink Signal," 2019 International Conference on Electronics, Information, and Communication (ICEIC), Auckland, New Zealand, 2019, pp. 1-3, (Year: 2019).*

J. Henrie, A. Christianson and W. J. Chappell, "Cancellation of Passive Intermodulation Distortion in Microwave Networks," 2008 38th European Microwave Conference, Amsterdam, Netherlands, 2008, pp. 1153-1156, doi: 10.1109/EUMC.2008.4751663. (Year: 2008).*

International Search Report and Written Opinion issued in International Application No. PCT/CN2020/079862 dated Dec. 18, 2020 (8 pages).

(56) References Cited

OTHER PUBLICATIONS

Qualcomm Incorporated, "Simulation results for PMI test for CSI class A", 3GPP TSG-RAN WG4 #79, R4-163531, Nanjing, China, May 23-27, 2016 (6 pages).

* cited by examiner

REMOVAL OF PASSIVE INTERMODULATION IN ANTENNA SYSTEMS

CROSS REFERENCE TO RELATED APPLICATIONS

This application is a 35 U.S.C. § 371 National Stage of International Patent Application No. PCT/CN2020/079862, filed Mar. 18, 2020.

TECHNICAL FIELD

Embodiments presented herein relate to a method, a controller, a computer program, and a computer program product for passive intermodulation removal in an antenna system.

BACKGROUND

In general terms, passive intermodulation (PIM) is a type of distortion generated by nonlinearity of passive components, such as filters, duplexers, connectors, antennas and so forth at a cell site. Depending on the location of the component that generates the PIM, the PIM is categorized as either internal or external. For example, PIM generated by the filters of the transmission (TX) radio chains in the antenna system at the cell site is called internal PIM whereas PIM generated by a metal fence on the roof top of a building in vicinity of the cell site is called external PIM. PIM might cause the transmission power of the cell site to be backed off in order to avoid PIM to affect the receiver (RX) radio chains in the antenna system of the cell site, thus compromising the network performance.

One way to mitigate PIM for active antenna systems (AASs) is to scale up existing solutions for classic antenna systems comprising from 2 to 8 TX radio chains (and equally may RX radio chains) to the AASs comprising from 16 to 64 or more TX radio chains or more (and equally may RX radio chains). One drawback of this approach is the computational cost that comes with it. Implementing a PIM cancellation function designed for traditional approaches in an AAS might be impractical.

Another way to mitigate PIM is to use the PIM eigen components in the uplink to steer the nulls in the downlink. However, this principle only tries to avoid exciting the PIM source. Null steering in the downlink comes with a cost of reduced capacity in terms of total power and spatial steering.

Further, in case of polynomial modeling of the PIM, the complexity of the third order non-linear modeling increases as $O(N^3)$ with respect to the number of antennas N. For example, if six polynomial terms are needed to model the PIM for an antenna system with two TX antennas and two RX antennas, the number of terms will increase to 40. In an antenna system with four TX antennas and 4 RX antennas, 40·4=160 polynomial terms need to be computed and tracked for each time the beam direction of the transmitter is changed.

Hence, there is still a need for an improved PIM mitigation, especially for AASs.

SUMMARY

An object of embodiments herein is to provide efficient PIM mitigation, not suffering from the issues noted above, or at least where the above identified issues are reduced or mitigated.

According to a first aspect there is presented a method for PIM removal in an antenna system. The method is performed by a controller of the antenna system. The method comprises identifying, during transmission using codebook based beamforming, which transmission radio chains of the antenna system that cause a signal received by receiver radio chains of the antenna system to be impacted by PIM. These transmission radio chains are identified based on which codeword in the codebook is used for the beamforming. The method comprises determining a correction signal by subjecting the signals only as transmitted by the identified transmission radio chains to a model of the PIM. The method comprises removing PIM from the signal received by the receiver radio chains by subtracting the correction signal from the signal received by the receiver radio chains.

According to a second aspect there is presented a controller of an antenna system for PIM removal in the antenna system. The controller comprises processing circuitry. The processing circuitry is configured to cause the controller to identify, during transmission using codebook based beamforming, which transmission radio chains of the antenna system that cause a signal received by receiver radio chains of the antenna system to be impacted by PIM. These transmission radio chains are identified based on which codeword in the codebook is used for the beamforming. The processing circuitry is configured to cause the controller to determine a correction signal by subjecting the signals only as transmitted by the identified transmission radio chains to a model of the PIM. The processing circuitry is configured to cause the controller to remove PIM from the signal received by the receiver radio chains by subtracting the correction signal from the signal received by the receiver radio chains.

According to a third aspect there is presented a controller of an antenna system for PIM removal in the antenna system. The controller comprises an identify module configured to identify, during transmission using codebook based beamforming, which transmission radio chains of the antenna system that cause a signal received by receiver radio chains of the antenna system to be impacted by PIM. These transmission radio chains are identified based on which codeword in the codebook is used for the beamforming. The controller comprises a determine module configured to determine a correction signal by subjecting the signals only as transmitted by the identified transmission radio chains to a model of the PIM. The controller comprises a remove module configured to remove PIM from the signal received by the receiver radio chains by subtracting the correction signal from the signal received by the receiver radio chains.

According to a fourth aspect there is presented a computer program for PIM removal in an antenna system, the computer program comprising computer program code which, when run on a controller of the antenna system, causes the controller to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide efficient PIM mitigation.

Advantageously, the proposed PIM removal does not suffer from the issues noted above.

Advantageously, these aspects enable fast tracking and convergence of the PIM model Advantageously, these aspects are based on the PIM model coefficients being computed in relation to the beamforming codebook information Advantageously, these aspects result in a reduction in computational complexity compared to traditional mechanisms for PIM mitigation.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
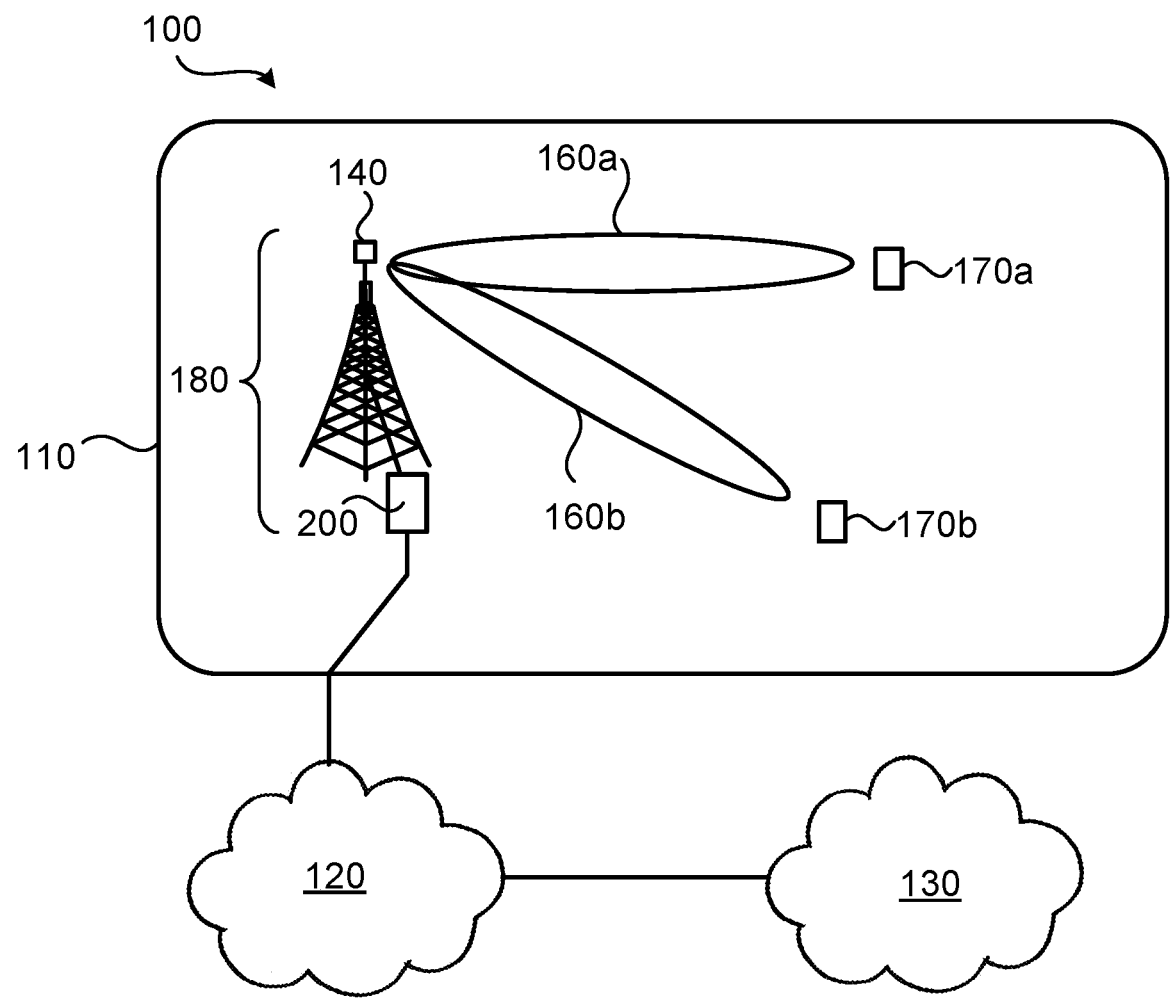
FIG. 1 is a schematic diagram illustrating a communications network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, or a fifth (5G) telecommunications network and support any 3GPP telecommunications standard, where applicable.

The communication network 100 comprises a radio network node 180 configured to provide network access to at least one terminal device 170a, 170b in a radio access network 110. The radio access network 110 is operatively connected to a core network 120. The core network 120 is in turn operatively connected to a service network 130, such as the Internet. The terminal devices 170a, 170b is thereby enabled to, via the radio access network node 180, access services of, and exchange data with, the service network 130.

The radio access network node 180 comprises, is collocated with, is integrated with, or is in operational communications with, an antenna system 140. The antenna system 140 might be an active antenna system. The radio access network node 180 (via its antenna system 140) and the terminal devices 170a, 170b are configured to communicate with each other in beams 160a, 160b. The antenna system 140 is thus configured for beamformed transmission.

The communication network 100 further comprises a controller 200. Further aspects of the controller 200 will be disclosed below.

Examples of radio access network nodes 180 are radio base stations, base transceiver stations, Node Bs, evolved Node Bs, g Node Bs, access points, and access nodes, and backhaul nodes. Examples of terminal devices 170a, 170b are wireless devices, mobile stations, mobile phones, handsets, wireless local loop phones, user equipment (UE), smartphones, laptop computers, tablet computers, network equipped sensors, network equipped vehicles, and so-called Internet of Things devices.

Figure 2:
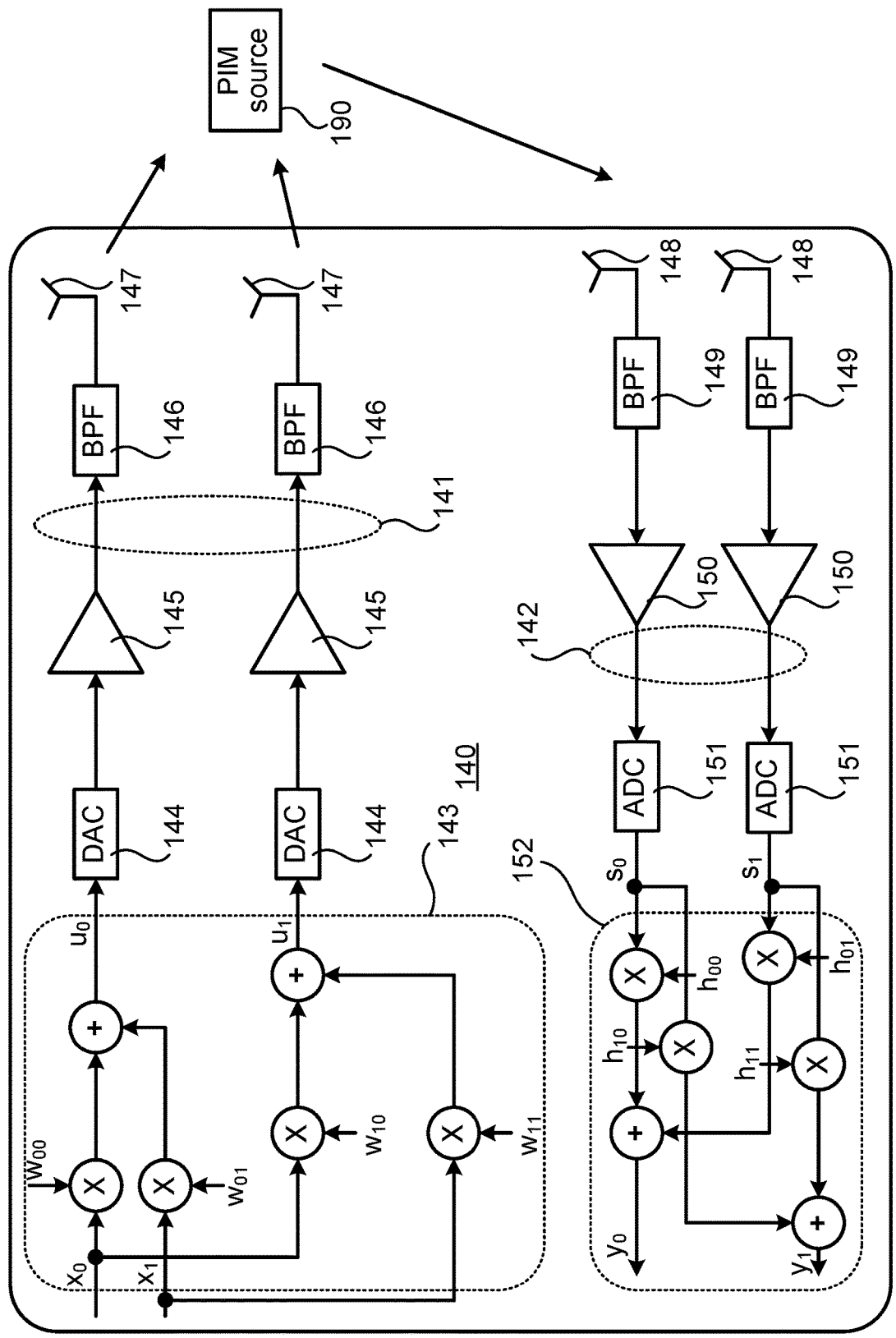
FIG. 2 schematically illustrates an antenna system according to an embodiment.

FIG. 2 schematically illustrates the antenna system 140 of FIG. 1 in more detail. The antenna system 140 comprises two transmission radio chains 141 and two receiver radio chains 142. The original signals $x_0$ and $x_1$ are first weighted by precoding coefficients w in an encoder part 143 to form signals $u_0$ and $u_1$. The signals $u_0$ and $u_1$ can be used for PIM removal. The signals $s_0$ and $s_1$ at the receiver side are weighted by decoding coefficients h in a decoder part 152. The signals $s_0$ and $s_1$ (and also $y_0$ and/or $y_1$) can be used for PIM removal. The values of the precoding coefficients w and the decoding coefficients h are defined by which codeword is used for the beamformed transmission. The precoding coefficients are generated by the precoding matrix with the codebook information, i.e. the codebook index is pointed to certain precoding coefficients which have gain and phase information for beamforming in a specific direction.

Each transmission radio chain 141 in turn comprises components, such as a digital-to-analogue (DAC) converter 144, a power amplifier (PA) 145, a bandpass filter (BPF) 146, and a single or double polarized antenna element 147. Each receiver radio chain 142 in turn comprises components, such as a single or double polarized antenna element 148, a BPF 149, a low noise amplifier (LNA) 150, and an analogue-to-digital (ADC) converter 151. The skilled person would understand how the antenna system 140 could be extended to comprise more than two transmission radio chains 141 and more than two receiver radio chains 142, such as in an AAS.

FIG. 2 also schematically illustrates an external PIM source 190. Signals transmitted from one or more of the transmission radio chains 141 might thus be (distorted and) reflected by the external PIM source 190 and received by at least one of the receiver radio chains 142, thus causing PIM. Additionally or alternatively, PIM might be caused by any of the components 143-147 of the transmission radio chain 141. That is, in some embodiments, the PIM is caused by a PIM source 190 external to the antenna system 140 whereas in other embodiments, the PIM is caused by a passive electric component of at least one of the identified transmission radio chains 141.

As disclosed above there is still a need for an improved PIM mitigation, especially for AASs.

In further detail, existing mechanisms for PIM cancellation do not take advantage of the potential inherited system information that can be leveraged upon for an AAS system in order to reduce complexity and computational cost for removing PIM. As a consequence, PIM model tracking, as well as the PIM modeling itself, would be unnecessary complex and computationally costly.

The embodiments disclosed herein therefore relate to mechanisms for PIM removal in an antenna system 140. In order to obtain such mechanisms, there is provided a controller 200 of the antenna system 140, a method performed by the controller 200, a computer program product comprising code, for example in the form of a computer program, that when run on a controller 200, causes the controller 200 to perform the method.

Figure 3:
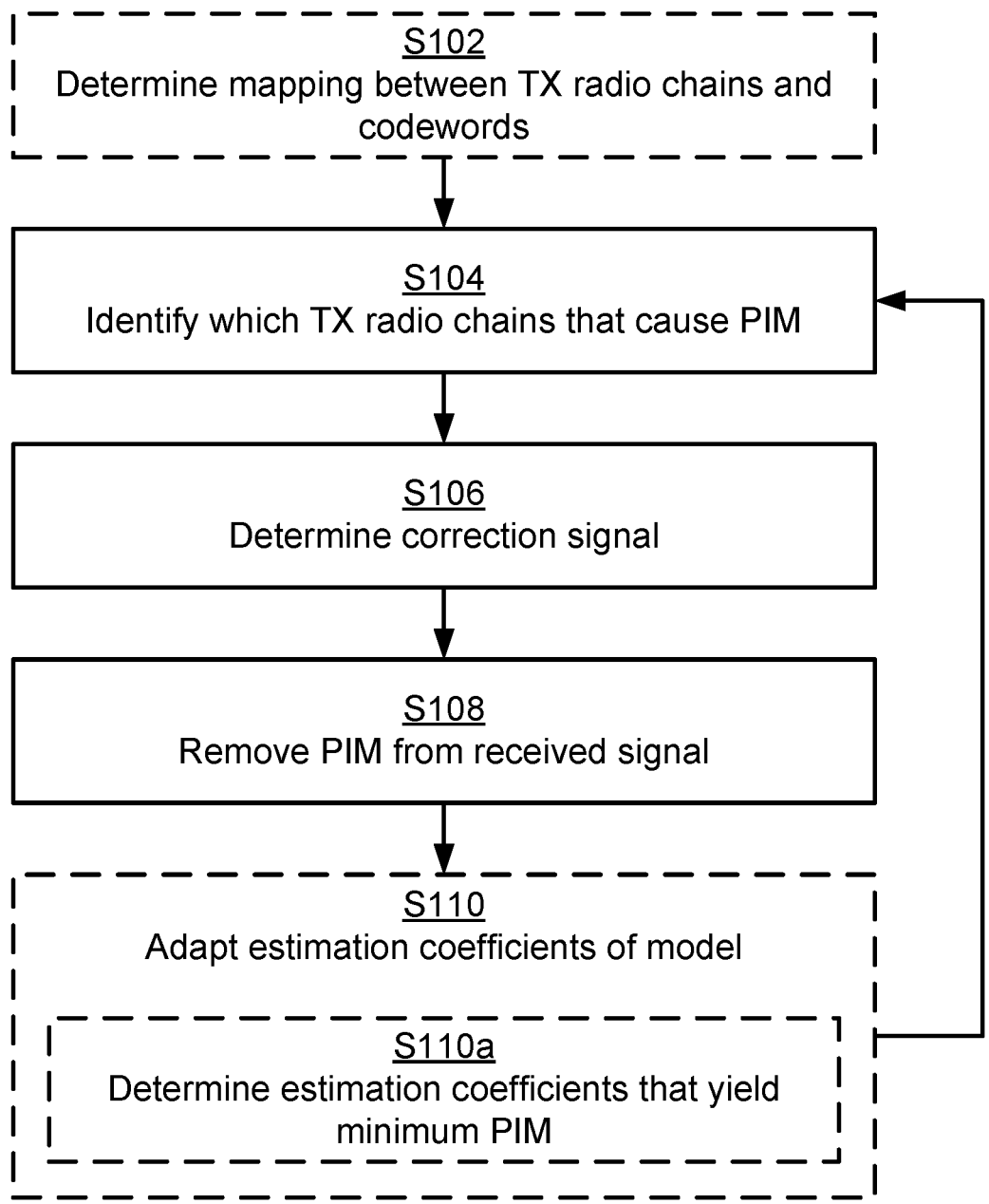
FIGS. 3 and 6 are flowcharts of methods according to embodiments.

FIG. 3 is a flowchart illustrating embodiments of methods for PIM removal in an antenna system 140. The methods are performed by the controller 200 of the antenna system 140. The methods are advantageously provided as computer programs 920.

It is assumed that signal transmission is to be performed using codebook based beamforming. The beamforming is involves precoding the signal using coefficients in the codebook as specified by a codeword. The information of which codeword was used during the beamformed signal transmission is then utilized for PIM mitigation purposes. In particular, the controller 200 is configured to perform step S104:

S104: The controller 200 identifies, during transmission using codebook based beamforming, which transmission radio chains 141 of the antenna system 140 that cause a signal received by receiver radio chains 142 of the antenna system 140 to be impacted by PIM. These transmission radio chains 141 are identified based on which codeword in the codebook is used for the beamforming.

The PIM is then mitigated based only on the signals transmitted by the identified transmission radio chains 141. That is, information of the signals as transmitted by any transmission radio chain 141 not having been identified is not utilized for the PIM mitigation. In particular, the controller 200 is configured to perform step S106:

S106: The controller 200 determines a correction signal by subjecting the signals only as transmitted by the identified transmission radio chains 141 to a model of the PIM.

PIM is then removed from the signal by means of the determined correction signal. In particular, the controller 200 is configured to perform step S108:

S108: The controller 200 removes PIM from the signal received by the receiver radio chains 142 by subtracting the correction signal from the signal received by the receiver radio chains 142.

Embodiments relating to further details of PIM removal in an antenna system 140 as performed by the controller 200 of the antenna system 140 will now be disclosed.

In some aspects, PIM is removed from all receiver radio chains 142 whereas in other aspects PIM is removed from only some of the receiver radio chains 142. Particularly, according to an embodiment, PIM is removed from the signal only from those of the receiver radio chains 142 having been identified as being impacted by the PIM. From which of the receiver radio chains 142 PIM needs to be removed can be determined in similar manner as which transmission radio chains 141 are identified as causing the receiver radio chains 142 to be impacted by PIM.

There may be different ways to identify which transmission radio chains 141 that cause the PIM. In some aspects, the transmission radio chains 141 that cause the PIM are identified by means of a mapping between transmission radio chains 141 and codewords. Therefore, in some embodiments, the controller 200 is configured to perform (optional) step S102:

S102: The controller 200 determines a mapping between transmission radio chains 141 and codewords by identifying which of the transmission radio chains 141 that, for each codeword in the codebook, cause any signal as received by the receiver radio chains 142 of the antenna system 140 to be impacted by PIM.

This mapping can then be used to identify the transmission radio chains 141 that cause the PIM. That is, in some embodiments, this mapping is used to identify those of the transmission radio chains 141 that cause the aforementioned any signal received by the receiver radio chains 142 to be impacted by PIM during transmission using codebook based beamforming.

Figure 4:
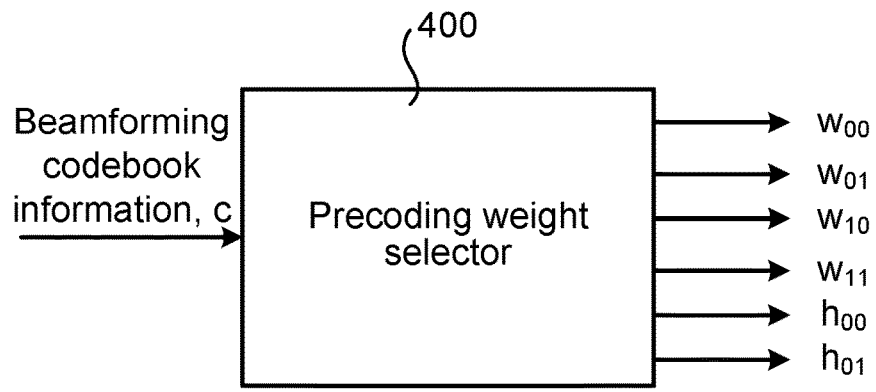
FIG. 4 schematically illustrates selection of precoding decoding weights according to an embodiment.

FIG. 4 schematically illustrates a precoding weight selector 40o that selects precoding coefficients w and decoding coefficients h based on which codeword c is used for the beamforming. Each codebook entry, or codeword, used for the precoding provides a pointer to one or more specific PIM aggressors (i.e., to one or more of the transmission radio chains 141). These PIM aggressors are thus the transmission radio chains 141 which will cause one or more of the receiver radio chains 142 to be impacted by PIM. The signals from other transmission radio chains 141 that will not cause PIM (for example for which the beam is not reflected by the external PIM source 190) will not be used for PIM mitigation purposes. As such, the computation complexity of the PIM removal can be reduced. The correction signal, hereinafter denoted $x_{pim}$:

$$x_{PIM} = f_c(U(M(c))|c),$$

where $U = [u_0, u_1, \ldots, u_{K-1}]$ denote the signals to the transmitter branches, c is the codebook index, M(c) is an index function that produces a list of transmitter signals to be used for PIM modelling for a codebook index c, U(M(c)) defines the subset of the signals $u_0, u_1, \ldots, u_{K-1}$ to be used for modelling, as selected by the index function M. The index function M selects k out of all K antenna branches (for example, 4 out of 64 antenna branches) as important for the PIM model, and the function $f_c$ is then adapted to match and remove (or even cancel) PIM of a receiver branch optimally using only these inputs. The function $f_c$ might be separately adapted for each receiver branch and each codebook index (but a similar process could be made to only cancel PIM for a selected few receiver branches if required). In further examples, the index function M is different for each receiver branch.

The modelled PIM signal $x_{pim}$ (i.e., the correction signal) will hence be subtracted from the received $s_0$ or $s_1$ in FIG. 2 depending on from which receiver radio chain 142 PIM is to be removed (i.e., from $s_0$ or $s_1$). As will be further disclosed below, the error from the subtraction can be minimized by adapting the model, resulting in a PIM-free received output signal.

There could be different ways to process the signal when the signal is subjected to the model of the PIM in step S106. In some aspects, the processing involves filtering. In particular, in some embodiments, subjecting the signal to the model involves filtering the signal with estimation coefficients of the model defining filter taps. There could be different examples of filters used for this filtering. In some embodiments, the signal is filtered using a non-linear filter.

As disclosed above, in step S108, PIM is removed from the signal received by the receiver radio chains 142. Removing PIM from the signal received by the receiver radio chains 142 thus yields a PIM removed signal. In this respect, how much PIM that is removed depends on how well the correction signal captures the PIM. In turn, how well the correction signal captures the PIM depends on how well the model captures the PIM.

In some aspects, a feedback mechanism is introduced by means of which the model is adapted. In particular, in some embodiments, the controller 200 is configured to perform (optional) step S110:

S110: The controller 200 adapts estimation coefficients of the model based on how much PIM is still present in the PIM removed signal.

There could be different ways in which the estimation coefficients are adapted. In some aspects, the estimation coefficients are selected according as the solution to an optimization problem where the object is to minimize the PIM. That is, in some embodiments, the controller 200 is configured to perform (optional) step S110a as part of step S110:

S110a: The controller 200 determines which estimation coefficients that per each codeword in the codebook yield minimum PIM for those of the transmitter radio chains that per each codeword cause any signal received by the receiver radio chains 142 to be impacted by PIM.

Figure 5:
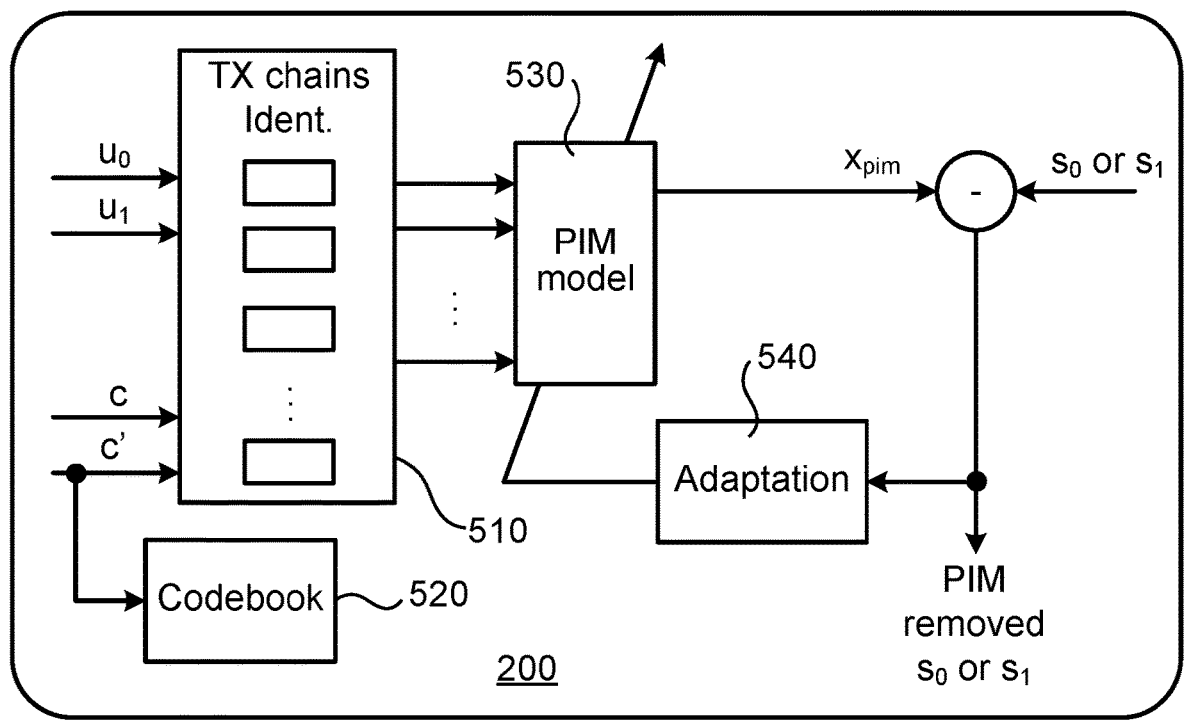
FIG. 5 schematically illustrates PIM removal in a controller according to an embodiment.

Reference is here made to FIG. 5 which schematically illustrates PIM removal in a controller 200 according to an embodiment. Based on which codeword c is used for the beamforming, those transmission radio chains of the antenna system that cause a signal received by receiver radio chains of the antenna system to be impacted by PIM are identified in TX chains identification block 510. In general terms, the model coefficients are specific for each codeword. That is, in some embodiments, the model has one set of estimation coefficients per each codeword. If a new codeword c' is used for the beamforming, the new codeword c' is added to the codebook 520. A correction signal $x_{pim}$ is determined by subjecting the signals only as transmitted by the identified transmission radio chains to the model 530 of the PIM. The PIM is then removed from the signal $s_0$ or $s_1$ as received by the receiver radio chains by subtracting the correction signal $x_{pim}$ from the signal $s_0$ or $s_1$ as received by the receiver radio chains. The adaptation block 540 takes as input the PIM removed signal and determines which estimation coefficients that for the used codeword in the codebook yield minimum PIM. The estimation coefficients as adapted are then provided to the model 530.

Figure 6:
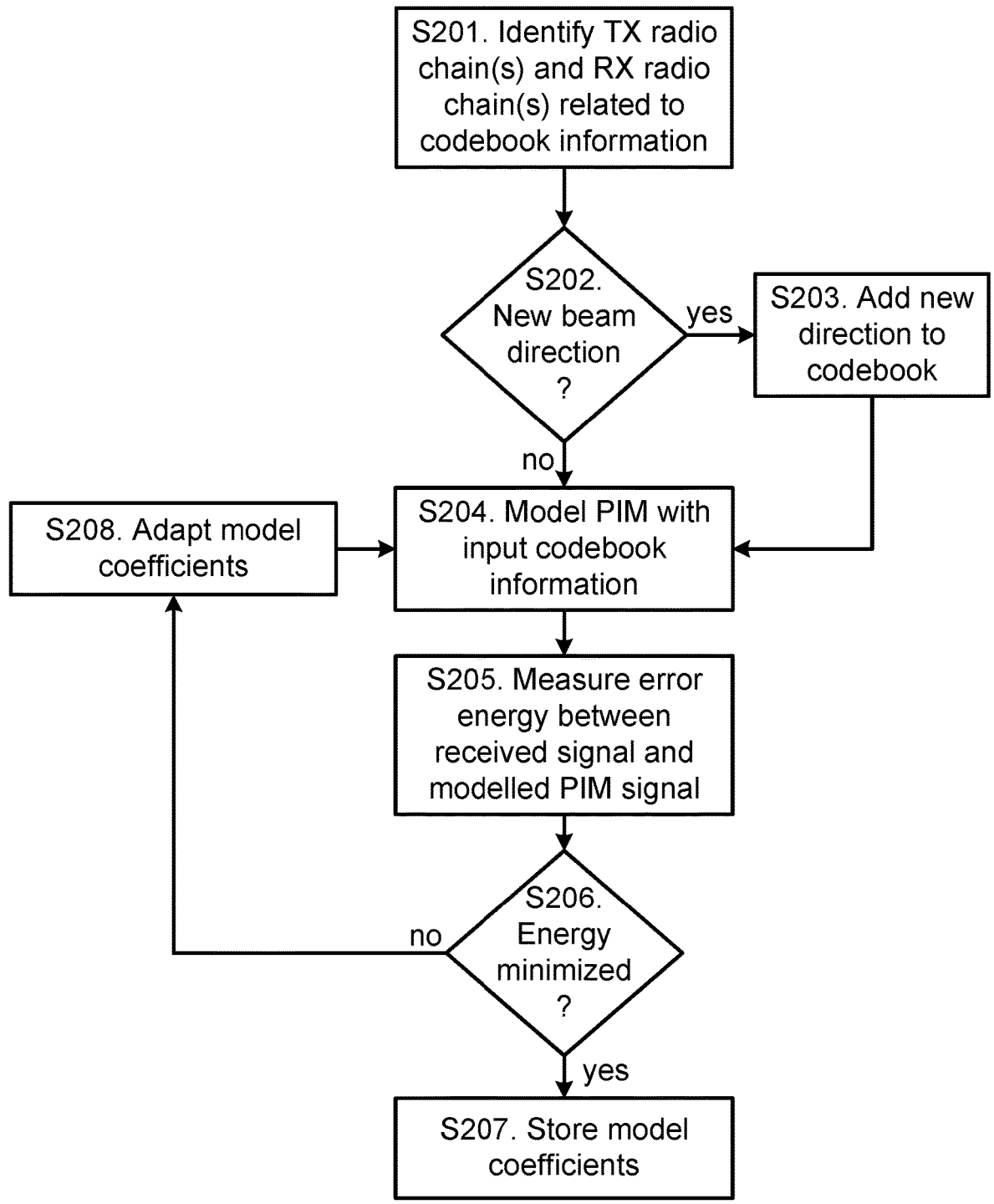

FIG. 6 is a flowchart of a method for adapting the model in accordance with embodiments disclosed herein.

S201: Those transmission radio chains 141 of the antenna system 140 that cause a signal received by receiver radio chains 142 of the antenna system 140 to be impacted by PIM are identified based on codebook information.

S202: It is checked whether PIM removal has been performed for the codeword used for the beamforming or if the codeword indicates that the beamforming is in a new direction. If the beamforming is in a new direction step S2o3 is entered, and else step S204 is entered.

S203: The new direction is added to the codebook.

S204: A correction signal is determined by subjecting the signals only as transmitted by the identified transmission radio chains 141 to a model of the PIM. The PIM is modelled based on codebook information, such as which codeword was used for the beamforming. That is, the estimation coefficients of the model are selected dependent on which codeword was used for the beamforming. If the beamforming is in new direction (i.e., step S203 was entered) use default values of the estimation coefficients could be used.

Which estimation coefficients that for the codeword yield minimum PIM are then estimated by steps S205, S206, and S208 being iteratively performed S205: The error energy is measured as a difference between the received signal and the correction signal. This corresponds to the energy of the PIM removed signal.

S206: It is checked whether a minimum of the error energy has been reached, and hence if the power of the PIM removed signal has been minimized. If yes, step S207 is entered, and else step S208 is entered.

S207: The estimation coefficients of the model are stored for later use when beamforming using the same codeword is performed.

S208: The estimation coefficients of the model are adapted based on how much PIM is still present in the PIM removed signal. Step S204 is then entered again where the estimation coefficients as adapted in step S208 are used when determining the correction signal.

Ways to identify which transmission radio chains 141 that cause the PIM have been disclosed. Further in this respect, there could be different ways to determine how many transmission radio chains 141 that are to be considered by the model and thus that are to be identified. Aspects relating thereto will now be disclosed.

In some aspects, how many transmission radio chains 141 that are to be considered by the model depends on how many transmission radio chains 141 there are in total in the antenna system 140. For example, if the total number of transmission radio chains 141 is comparatively high, only a small fraction of all the transmission radio chains 141 might be considered by the model whereas if the total number of transmission radio chains 141 is comparatively low, a large fraction of all the transmission radio chains 141 might be considered by the model in order to keep a reasonable level of complexity and computational cost at the controller 200. That is, in some embodiments, how many transmission radio chains 141 that are to be identified in step S104 is dependent on how many transmission radio chains 141 there are in total.

In some aspects, how many transmission radio chains 141 that are to be considered by the model depends on the amount of PIM caused. In particular, in some embodiments, how many transmission radio chains 141 that are to be identified in step S104 is dependent on how much, or how many of, the receiver radio chains 142 are impacted by the PIM. In this respect, for a comparatively high level of PIM, more transmission radio chains 141 might be considered by the model than for only a comparatively low level of PIM. The design of the PIM model could thereby be adapted to handle different levels of PIM in an efficient manner.

In some aspects, a fixed amount of transmission radio chains 141 are considered by the model. That is, in some embodiments, at most a predefined number of all transmission radio chains 141 are identified in in step S104. This might enable an efficient implementation of the PIM model since it could be designed for one particular number of transmission radio chains 141.

Figure 7:
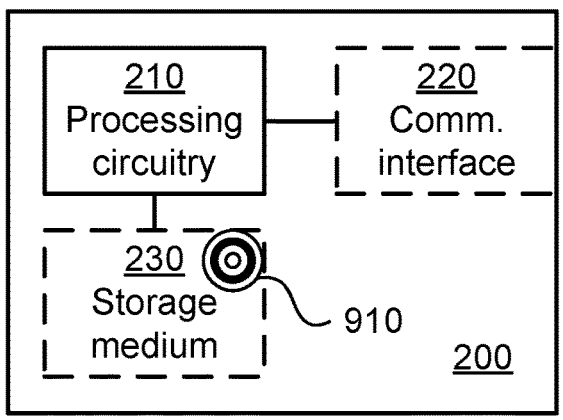
FIG. 7 is a schematic diagram showing functional units of a controller according to an embodiment.

FIG. 7 schematically illustrates, in terms of a number of functional units, the components of a controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the controller 200 to perform a set of operations, or steps, as disclosed above. For example, the storage medium 230 may store the set of operations, and the processing circuitry 210 may be configured to retrieve the set of operations from the storage medium 230 to cause the controller 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The controller 200 may further comprise a communications interface 220 at least configured for communications with the antenna system 140. As such the communications interface 220 may comprise one or more transmitters and receivers, comprising analogue and digital components. The processing circuitry 210 controls the general operation of the controller 200 e.g. by sending data and control signals to the communications interface 220 and the storage medium 230, by receiving data and reports from the communications interface 220, and by retrieving data and instructions from the storage medium 230. Other components, as well as the related functionality, of the controller 200 are omitted in order not to obscure the concepts presented herein.

Figure 8:
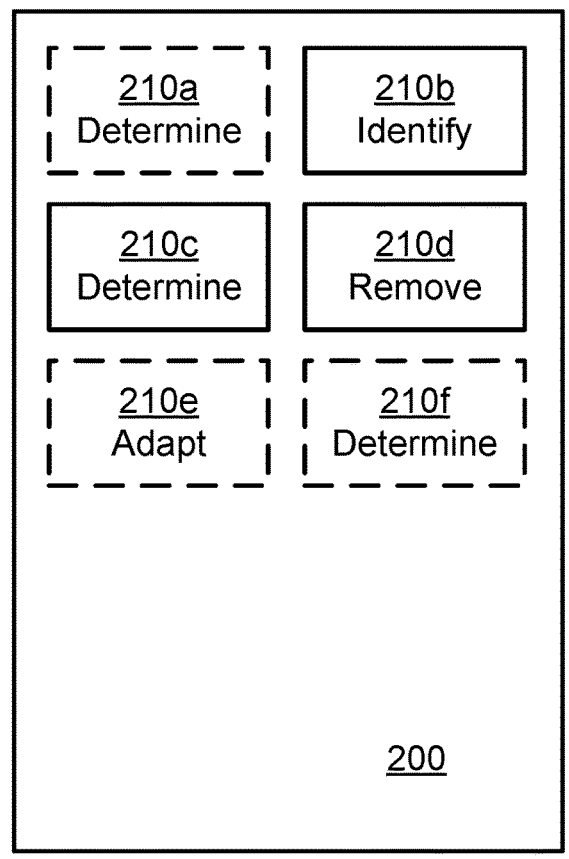
FIG. 8 is a schematic diagram showing functional modules of a controller according to an embodiment.

FIG. 8 schematically illustrates, in terms of a number of functional modules, the components of a controller 200 according to an embodiment. The controller 200 of FIG. 8 comprises a number of functional modules; an identify module 210*b* configured to perform step S104, a determine module 210C configured to perform step S106, and a remove module 210*d* configured to perform step S108. The controller 200 of FIG. 8 may further comprise a number of optional functional modules, such as any of a determine module 210*a* configured to perform step S210*a*, an adapt module 210*e* configured to perform step S110, and a determine module 210*f* configured to perform step S11*a*. In general terms, each functional module 210*a*-210*f* may in one embodiment be implemented only in hardware and in another embodiment with the help of software, i.e., the latter embodiment having computer program instructions stored on the storage medium 230 which when run on the processing circuitry makes the controller 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210*a*-210*f* may be implemented by the processing circuitry 210, possibly in cooperation with the communications interface 220 and/or the storage medium 230. The processing circuitry 210 may thus be configured to from the storage medium 230 fetch instructions as provided by a functional module 210*a*-210*f* and to execute these instructions, thereby performing any steps as disclosed herein.

The controller 200 may be provided as a standalone device or as a part of at least one further device. For example, the controller 200 may be provided in a node of the radio access network and might be part of, integrated with, or collocated with, the antenna system 140. Alternatively, functionality of the controller 200 may be distributed between at least two devices, or nodes. Thus, a first portion of the instructions performed by the controller 200 may be executed in a first device, and a second portion of the of the instructions performed by the controller 200 may be executed in a second device; the herein disclosed embodiments are not limited to any particular number of devices on which the instructions performed by the controller 200 may be executed. Hence, the methods according to the herein disclosed embodiments are suitable to be performed by a controller 200 residing in a cloud computational environment. Therefore, although a single processing circuitry 210 is illustrated in FIG. 7 the processing circuitry 210 may be distributed among a plurality of devices, or nodes. The same applies to the functional modules 210*a*-210*f* of FIG. 8 and the computer program 920 of FIG. 9.

Figure 9:
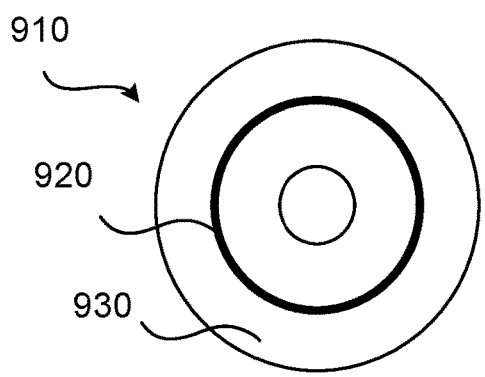
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for passive intermodulation (PIM) removal in an antenna system, the method being performed by a controller of the antenna system, the method comprising:
    identifying, during transmission using codebook based beamforming, which transmission radio chains of the antenna system that cause a signal received by receiver radio chains of the antenna system to be impacted by PIM, wherein these transmission radio chains are identified based on which codeword in the codebook is used for the beamforming;
    determining a correction signal by subjecting the signals only as transmitted by the identified transmission radio chains to a model of the PIM; and removing PIM from the signal received by the receiver radio chains by subtracting the correction signal from the signal received by the receiver radio chains.

2. The method of claim 1, wherein subjecting the signal to the model involves filtering the signal with estimation coefficients of the model defining filter taps.

3. The method of claim 2, wherein the signal is filtered using a non-linear filter.

4. The method of claim 1, wherein removing PIM from the signal received by the receiver radio chains yields a PIM removed signal, the method further comprising:
   adapting estimation coefficients of the model based on how much PIM is still present in the PIM removed signal.

5. The method of claim 4, the method further comprising:
   determining which estimation coefficients that per each codeword in the codebook yield minimum PIM for those of the transmitter radio chains that per each codeword cause any signal received by the receiver radio chains to be impacted by PIM.

6. The method of claim 1, wherein the model has one set of estimation coefficients per each codeword.

7. The method of claim 1, the method further comprising:
   determining a mapping between transmission radio chains and codewords by identifying which of the transmission radio chains that, for each codeword in the codebook, cause any signal as received by the receiver radio chains of the antenna system to be impacted by PIM.

8. The method of claim 7, wherein said mapping is used to identify those of the transmission radio chains that cause said any signal received by the receiver radio chains to be impacted by PIM during transmission using codebook based beamforming.

9. The method of claim 1, wherein how many transmission radio chains that are to be identified is dependent on how many transmission radio chains there are in total.

10. The method of claim 1, wherein how many transmission radio chains that are to be identified is dependent on how much, or how many of, the receiver radio chains are impacted by the PIM.

11. The method of claim 1, wherein at most a predefined number of all transmission radio chains are identified.

12. The method of claim 1, wherein PIM is removed from the signal only from those of the receiver radio chains having been identified as being impacted by the PIM.

13. The method of claim 1, wherein the PIM is caused by a PIM source external to the antenna system.

14. The method of claim 1, wherein the PIM is caused by a passive electric component of at least one of the identified transmission radio chains.

15. The method of claim 1, wherein the antenna system is an active antenna system.

16. A non-transitory computer readable storage medium storing instructions for configuring a controller of antenna system to perform the method of claim 1.

17. A controller of an antenna system for passive intermodulation, (PIM) removal in the antenna system, the controller comprising processing circuitry, the processing circuitry being configured to cause the controller to:
   identify, during transmission using codebook based beamforming, which transmission radio chains of the antenna system that cause a signal received by receiver radio chains of the antenna system to be impacted by PIM, wherein these transmission radio chains are identified based on which codeword in the codebook is used for the beamforming;
   determine a correction signal by subjecting the signals only as transmitted by the identified transmission radio chains to a model of the PIM; and
   remove PIM from the signal received by the receiver radio chains by subtracting the correction signal from the signal received by the receiver radio chains.

* * * * *